Patented Oct. 8, 1940

2,217,632

UNITED STATES PATENT OFFICE 2,217,632

NITRILES AND METHOD OF PREPARING THE SAME

William D. Wolfe, Cuyahoga Falls, Ohio, assignor to Wingfoot Corporation, Wilmington, Del., a corporation of Delaware No Drawing. Application February 25, 1939, Serial No. 258,581

6 Claims. (Cl. 260—464)

This invention relates to an improved method of preparing cyclic compounds and to new compounds of this type. More particularly, it relates to a method of synthesizing benzo nitriles and compounds which may be considered as derivatives thereof.

Rubber-like or resinous copolymers have been prepared from butadiene and acrylo nitrile by heating these unsaturated compounds in a suitable medium until combination of considerable complexity takes place between the two monomeric materials. It has now been found that, if the conditions be suitably altered, the formation of a plastic is prevented or greatly inhibited and a simpler combination takes place between the butadiene and the acrylo nitrile, which may be aptly termed a cyclization. This cyclization consists in a joining of the two molecules to form a partially unsaturated ring, the equation for such reaction probably being illustrated by the following:

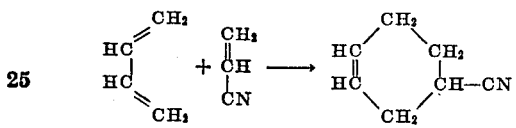

The cyclization is favored at the expense of the plastic-forming polymerization by providing, in the emulsion containing the two monomeric materials, a small proportion of a metal having the effect of inhibiting the polymerization, copper and manganese having been found to be effective. The amount of inhibitor or cyclization promoter is measured in parts per million on the total monomer being treated or on the weight of the whole emulsion, reference to the total monomers being preferred in view of the greater definiteness of this standard. Thus, 10 or 15 ppm. of copper definitely inhibits the formation of a chain copolymer and promotes the formation of substantial quantities of the cyclic compound and as little as 1 ppm. of manganese has a like effect. Indeed, as little as .3 ppm. of manganese has been found to promote the formation of the benzo nitrile in the foregoing reaction. In the case of copper, however, a selective action is observable in that copper in the lower ranges, from 0.5 to 5.0 ppm. assists the formation of the chain copolymer. It is only when the copper is increased to as much as 10 ppm. and preferably 15 ppm. that the formation of the cyclic compound is favored at the expense of the copolymer. Of course, it will be understood that both plastic and benzo nitrile will be formed when intermediate proportions of copper, say, from 5–10 ppm. are present, the effect gradually shifting the product from plastic polymer to oily benzo nitrile as the copper is increased. Nevertheless, a major proportion of the reacting materials may be converted into one or the other product by adjustment of the proportions of copper present.

The reaction medium for the new process is substantially that employed in copolymerization to obtain rubber-like or plastic masses, with the addition thereto of the specified catalyst. Such emulsions customarily contain, in addition to the monomers, an emulsifying agent, such as sodium oleate, sodium stearate, or "Aquarex D," a sodium sulfate ester of higher alcohols. An oxidant, such as sodium perborate or hydrogen peroxide or some organic peroxide is present and a promoter or activator, such as carbon tetrachloride, chloro benzene or ethylene dichloride is also used. The emulsion is essentially aqueous. It will be realized that the constituents of the emulsion may be varied without departing from the scope of the invention, provided only that a cyclization promoter or catalyst is present.

The cyclization promoter, namely, copper or manganese, is preferably added in the form of a salt, copper sulfate and manganese sulfate acting as cyclization catalysts when used in the proportions indicated, namely, from about 10 ppm. of copper and from about 1 ppm. of manganese, no upper limit being prescribed except that additional amounts cease to increase the effect appreciably and there is, accordingly, no object in adding more. However, copper up to 30 ppm. and manganese up to 4 ppm. have been used without decreasing the efficiency of benzonitrile formation. The effect may also be obtained by providing the catalyst in metallic form, as by including a small piece of copper or brass in the reaction vessel.

The method is applicable not only to the preparation of $\Delta^3$ tetrahydro benzo nitrile from butadiene and acrylo nitrile, as in the foregoing equation, but may also be used to catalyze the reaction of butadienes generally with nitriles of acrylic acids, esters of acrylic acids and the acrylic acids themselves. Thus, 1:3-butadiene, methyl butadiene or isoprene and dimethyl butadiene may be reacted with acrylo nitrile, methacrylonitrile, ethacrylonitrile, propyl acrylonitrile, butyl acrylonitrile, amyl acrylonitrile, and alpha chlor acrylo nitrile. This reaction results in formation of a nitrile, such as Δ³ 1-methyl tetrahydro benzonitrile,

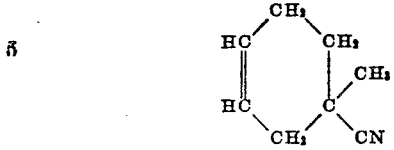

from the mol for mol reaction of butadiene and methacrylonitrile.

The butadienes may also be reacted with the following esters of acrylic acids: methyl acrylate, ethyl acrylate, isobutyl acrylate, secondary butyl acrylate, isoamyl acrylate, 2-methyl amyl acrylate, 3-methyl amyl acrylate, 2-2-dimethyl butyl acrylate, 2-3-dimethyl butyl acrylate, 2:ethyl hexyl acrylate, benzyl acrylate, methyl methacrylate, ethyl methacrylate, isobutyl methacrylate, isoamyl methacrylate, 2-ethyl hexyl methacrylate, isoamyl ethacrylate, and isobutyl propacrylate. Reaction of any one of these esters with any one of the butadienes mentioned results in a hydrogenated benzoic acid ester, an example of this being the benzyl ester of Δ³ tetrahydro benzoic acid,

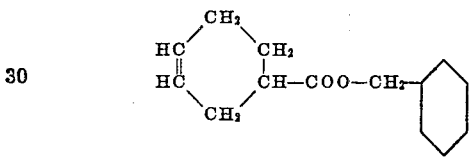

resulting from the reaction of butadiene and benzyl acrylate.

The butadienes may also be reacted with the following acrylic acids, among others, acrylic acid, methacrylic acid, ethacrylic acid, and propacrylic acid. This reaction results in the formation of the free acids, such as Δ³ tetrahydro benzoic acid,

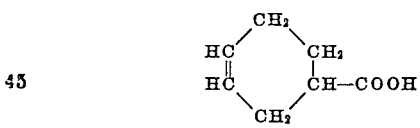

from butadiene and acrylic acid.

The nitriles resulting from this reaction have not been heretofore prepared, so far as known, and are, accordingly, believed to be new compounds. The method of preparation and the identity of the nitriles is illustrated in the following examples to which, however, the invention is not limited.

*Example 1*

A mixture of 115 grams of butadiene and 85.5 grams of acrylonitrile was placed in a glass lined bomb which contained a solution of an emulsifying agent together with sodium perborate and carbon tetrachloride as catalysts of polymerization. The lid of the bomb was provided with a brass fitting which came in contact with the charge during the period of agitation which lasted seven days at 70° C. The whole contents of the bomb was finally steam distilled to yield 95 grams of a clear oil in the condensate and only 5 or 6 grams of a soft sticky polymer remained in the flask. Redistillation of the oil yielded 84 grams of a liquid boiling at 188–192° C. at atmospheric pressure. The index of refraction was 1.472 and density 0.95 g/cc. The odor was reminiscent of nitro benzene. The product was believed to be Δ³ tetrahydro benzonitrile and, in order to prove this, a portion of the oil was hydrolyzed to the corresponding acid which proved to be the known Δ³ tetrahydro benzoic acid.

*Example 2*

In another experiment, a glass lined bomb was charged with a mixture of butadiene and a methacrylo nitrile, a brass fitting being allowed to come in contact with the emulsion for only part of the reaction time. Polymerization to a rubber-like material, normally to be expected, was practically inhibited and steam distillation of the product yielded 20 grams of an oil which distilled at 83° C. at 19 mm. pressure. The oil had an odor mildly resembling camphor and was believed to be Δ³ 1-methyl tetrahydro benzonitrile, formed by mol for mol reaction of butadiene and methacrylo nitrile. Accordingly, a portion of the nitrile was hydrolyzed to the corresponding carboxylic acid, the latter crystallizing as beautiful white needles from diluted acetone; melting point 77.5° C. The neutralization equivalent was 140.6 which agrees with the molecular weight of 140.1, the calculated value for Δ³-1-Me tetrahydro benzoic acid.

Repetition of these experiments with variations in the amounts of copper sulfate or manganese sulfate present resulted each time in repression of plastic polymerization and promotion of the formation of a cyclic compound. Copper sulfate in amount of 15 ppm. almost stops this plastic polymerization and results in the production of abundant quantities of cyclic nitriles. Likewise, the presence of manganese sulfate in similar amounts, or even less, gives equally satisfactory results.

While there have been described above certain preferred embodiments of the invention, the same is not limited thereto but only by the appended claims wherein it is intended to set forth all features of patentable novelty residing in such invention.

What I claim is:

1. A method of preparing cyclonitriles which comprises reacting a 1,3-butadiene and a nitrile of an acrylic acid in the presence of a metal from the group consisting of copper and manganese, the copper being present in amount at least 10 ppm. and the manganese at least 1 ppm. calculated on the basis of the total monomers present.

2. A method of preparing cyclonitriles which comprises reacting a 1,3-butadiene and a nitrile of an acrylic acid in the presence of a metal from the group consisting of copper and manganese, the copper being present in amount at least 10 ppm. and the manganese at least 1 ppm. calculated on the basis of the total monomers present.

3. A method of preparing cyclonitriles and derivatives thereof which comprises reacting a 1,3-butadiene and an ester of an acrylic acid in the presence of a metal from the group consisting of copper and manganese, the copper being present in amount at least 10 ppm. and the manganese at least 1 ppm. calculated on the basis of the total monomers present.

4. A method of preparing cyclonitriles and derivatives thereof which comprises reacting a 1,3-butadiene and a member of the group consisting of acrylic acids, esters of acrylic acids and nitriles of acrylic acids in the presence of a polymerization inhibitor from the group consisting of copper and manganese, the copper being present in amount at least 10 ppm. and the manganese at least 1 ppm. calculated on the basis of the total monomers present.

5. A method of preparing cyclonitriles and derivatives thereof which comprises reaction a 1,3-butadiene and a member of the group consisting of acrylic acids, esters of acrylic acids and nitriles of acrylic acids in the presence of a catalyst from the group consisting of copper and manganese, the copper being present in amount between 10 and 30 ppm. and the manganese between 1 and 4 ppm. calculated on the basis of the total monomers present.

6. A method of preparing Δ-3-tetrahydro benzo nitrile which comprises reacting butadiene-1,3 and acrylonitrile in the presence of 10-15 ppm. of copper calculated on the basis of the total monomers present.

WILLIAM D. WOLFE.